US 8,417,848 B2

(12) United States Patent
Yang et al.

(10) Patent No.: US 8,417,848 B2
(45) Date of Patent: Apr. 9, 2013

(54) METHOD AND APPARATUS FOR IMPLEMENTING MULTIPLE SERVICE PROCESSING FUNCTIONS

(75) Inventors: Wu Yang, Beijing (CN); Jinglin Li, Beijing (CN); Lizhong Wang, Beijing (CN); Ergang Zhu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 12/743,972

(22) PCT Filed: Jul. 22, 2008

(86) PCT No.: PCT/CN2008/071721
§ 371 (c)(1),
(2), (4) Date: May 20, 2010

(87) PCT Pub. No.: WO2009/065313
PCT Pub. Date: May 28, 2009

(65) Prior Publication Data
US 2010/0262819 A1 Oct. 14, 2010

(30) Foreign Application Priority Data
Nov. 20, 2007 (CN) .......................... 2007 1 0177719
Dec. 26, 2007 (CN) .......................... 2007 1 0160639

(51) Int. Cl.
*G06F 3/00* (2006.01)
*G06F 13/00* (2006.01)

(52) U.S. Cl.
USPC ............ 710/33; 710/2; 710/5; 710/8; 710/15; 710/65

(58) Field of Classification Search ........................ None
See application file for complete search history.

(56) References Cited

U.S. PATENT DOCUMENTS

2007/0067771 A1 * 3/2007 Kulbak et al. ................ 718/100
2009/0083516 A1 * 3/2009 Saleem et al. ................. 712/28

FOREIGN PATENT DOCUMENTS

| CN | 1921457 A | 2/2007 |
| CN | 101013383 A | 8/2007 |
| CN | 101067794 A | 11/2007 |
| EP | 0982595 A1 | 3/2000 |

OTHER PUBLICATIONS

International Search Report: PCT/CN2008/071721.

* cited by examiner

*Primary Examiner* — Scott Sun
(74) *Attorney, Agent, or Firm* — Ladas & Parry LLP (57) ABSTRACT

A multi-service processing method, including: configuring different cores of a multi-core processor to process different services; and sending received packets to the cores in the pre-defined service processing sequence. The multi-core processor apparatus, includes the configuration management unit, the packet distributing unit, and the multi-core processor. The method and apparatus can save investments in devices while implementing multiple service processing functions.

32 Claims, 6 Drawing Sheets

Sub-shared memory bank for core 0

METHOD AND APPARATUS FOR IMPLEMENTING MULTIPLE SERVICE PROCESSING FUNCTIONS

TECHNICAL FIELD

This invention relates in general to the field of network communications, and more particularly to a method and an apparatus for implementing multiple service processing functions.

BACKGROUND OF THE INVENTION

The development of communication services has posed increasingly higher requirements for network deployment and design. A network is required not only to forward packets correctly during a communication process, but also to perform multiple types of service processing when forwarding the packets so as to optimize the forwarding performance and availability of the network. Examples of such processing include antivirus processing, firewall processing, is traffic statistics collection and traffic accounting, traffic policing, and traffic regulation.

Figure 1:
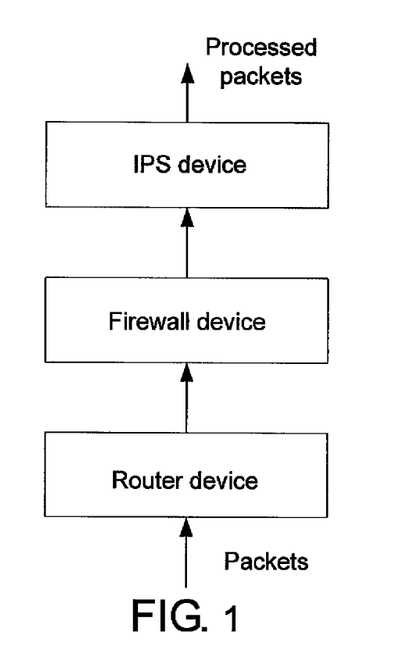
FIG. 1 is a schematic diagram illustrating a network for implementing multiple service processing functions in the prior art.

FIG. 1 is a schematic diagram illustrating a network for implementing multiple service processing functions in the prior art. In the existing approach, multiple network devices for providing different service processing functions are connected together to collaboratively implement multiple service processing functions. As shown in FIG. 1, a router device, a firewall device, and an Intrusion Prevention System (IPS) device are connected successively to perform routing and forwarding processing, firewall processing, and IPS processing for packets in turn. However, connecting different network devices to implement multiple service processing functions results in large investments and has many disadvantages such as poor interconnectivity between network devices and lack of ease of management and maintenance.

SUMMARY OF THE INVENTION

One object of the present invention is to provide a method for implementing multiple service processing functions in a network, and another object of the present invention is to provide an apparatus for implementing multiple service processing functions, so as to reduce investments in devices.

To achieve the said objects, technical proposals of the present invention are implemented as follows.

A method for implementing multiple service processing functions, which is implemented through an apparatus comprising a multi-core processor, includes:

configuring each core of the multi-core processor to perform a specific service processing function; and after receiving a packet, according to a pre-defined service processing sequence, sending the packet to the cores of the multi-core processor that execute service processing functions in turn.

An apparatus comprising a multi-core processor includes:

a configuration management unit, used for configuring each core of the multi-core processor to process a specific service;

a packet distributing unit, used for distributing a packet from an external physical interface to a core that performs the first service processing function; and cores of the multi-core processor, used for performing service processing functions for the received packet according to a pre-defined service processing sequence and delivering the processed packet.

As can be seen, in the present invention, the multi-core processor in the apparatus can be used to implement multiple service processing functions. The cores of the multi-core processor emulate different network devices mentioned in the prior art to provide different service processing functions. Consequently, the present invention allows a network device to implement multiple service processing functions with decreased device investments.

Additionally, as packets are exchanged between cores inside a device, the problem of poor interconnectivity between devices of different vendors is solved, and it is easy to manage and maintain devices.

Furthermore, in the present invention, virtual data channel units are used for delivering packets between cores. The virtual data channel units simulate physical interfaces through software in place of the related hardware and drive software. As the simulated interfaces still appear as physical interfaces to the upper-layer software, the upper-layer software can be ported to the multi-core processor without any modification. In this way, the present invention reduces the costs of porting software. In addition, because hardware chips are not used, hardware costs are reduced. Furthermore, in the present invention, virtual data channel units can deliver packets between cores using a shared memory and inter-core messages, which results in zero data copy, thereby dramatically improving packet transmitting/receiving efficiency.

DETAILED DESCRIPTION OF THE EMBODIMENTS

Currently, microprocessor technology has been developed rapidly, and multi-core processors have emerged. Simply, a multi-core processor combines multiple independent physical cores into a single wafer. These cores work in coordination and create multiplied performance. Each core has an independent logical architecture, including logical units such as the L1 cache, L2 cache, execution unit, instruction-level unit, and bus interface. A core equals an execution center responsible for calculation, accepting/storing commands, and to processing data in the CPU. Considering the present power consumption restrictions, multi-core processors are the optimal approach to chip performance improvement.

Based on a good many advantages of multi-core processors, the present invention provides a method for implementing multiple service is processing functions, comprising: configuring the cores of a multi-core processor to perform different services processing; delivering the received packets to the cores in the pre-defined service processing sequence.

Figure 2:
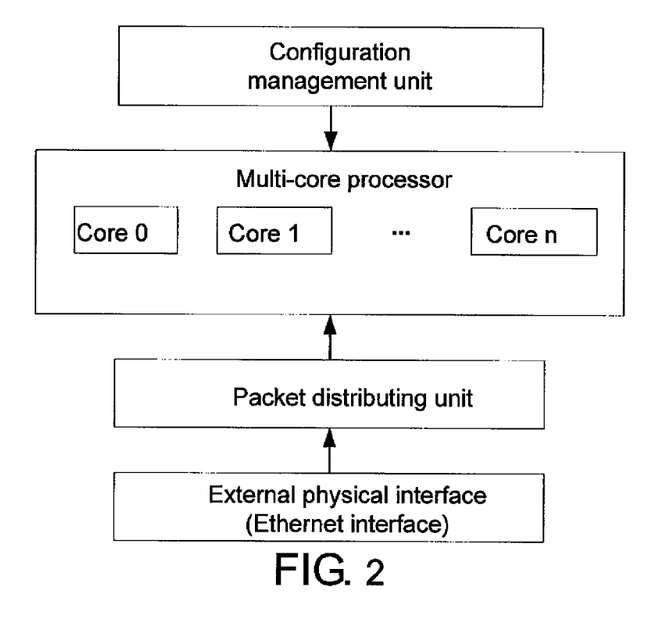
FIG. 2 is the block diagram of a multi-core processor apparatus according to an embodiment of the present invention.

Accordingly, the present invention provides a multi-core processor apparatus, i.e. an apparatus comprising a multi-core processor. FIG. 2 is the block diagram of the multi-core processor apparatus according to an embodiment of the present invention. As shown in FIG. 2, the multi-core processor apparatus comprises:

the configuration management unit, which is used for configuring each core of the multi-core processor to execute a service processing function;

the packet distributing unit, which is used for distributing packets received externally to the core executing the first service processing function as defined;

the cores providing different service processing functions, each performing a specific service processing function for the received packets and delivering the processed packets as per the pre-defined service processing sequence.

To clarify the purposes, technical proposals, and advantages of the present invention, the following part describes the present invention in detail in conjunction with the figures and embodiments.

Figure 3:
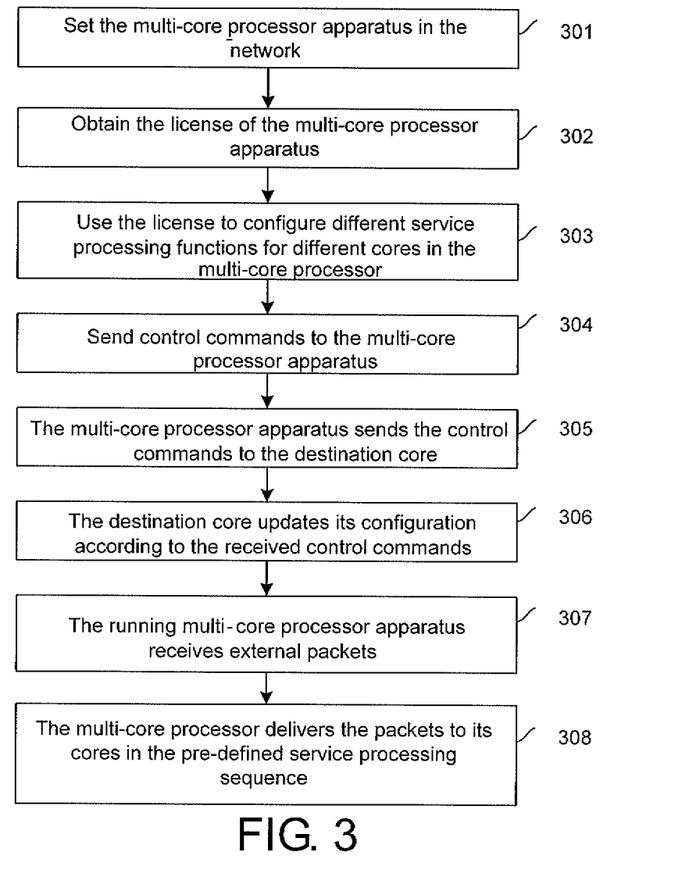
FIG. 3 is the flow chart of implementing multiple service processing functions in a network according to an embodiment of the present invention.

FIG. 3 is the flow chart of implementing multiple service processing functions in a network according to an embodiment of the present invention. As shown in FIG. 2 and FIG. 3, the detailed implementation procedure of multiple service processing functions of the present invention comprises these steps:

At step 301, set the multi-core processor apparatus in the network.

Wherein, the multi-core processor apparatus comprises the configuration management unit, the packet distributing unit, and the multi-core processor.

At step 302, obtain the license for the multi-core processor apparatus.

In this embodiment, preferably, the service provider can provide each multi-core processor apparatus user with a license to provide different service levels. The license contents can be designed in one of the following approaches for different purposes:

Approach 1: The license provided by the service provider records information about the service processing function assigned to each core of the multi-core processor. The license can thus be directly used for configuring different service processing functions for different cores subsequently.

Approach 2: The license provided by the service provider records the authorized service processing functions for users rather than information about the service processing function assigned to each core of the multi-core processor. In this approach, the license is not directly used for configuring different service processing functions for different cores subsequently. Rather, it is used for restricting your subsequent service processing function configuration.

At step 303, configure each core of the multi-core processor in the multi-core processor apparatus to perform a specific service processing function.

If a license issued in approach 1 is obtained at step 302, the license is directly used for performing configuration, comprising: when the multi-core processor starts, loading the service processing is function configuration (such as the operating system and application software information) for each core of the multi-core processor according to the service processing function information recorded in the license for the core.

If a license issued in approach 2 is obtained at step 302, use any of the following ways to configure each core of the multi-core processor in the multi-core processor apparatus to perform a specific service processing function:

Way 1: Use a configuration file, comprising:

A. Pre-setting configuration parameters in the configuration file of the multi-core processor apparatus to indicate the service processing function assigned to each core of the multi-core processor.

B. When the multi-core processor starts, the configuration management unit of the multi-core processor apparatus reading the configuration file from the BOOT menu, and then identifying the service processing function to be loaded and configured for each core of the multi-core processor according to the configuration parameters in the configuration file.

C. Before loading service processing function configuration (such as the operating system and application software) for each core, the configuration management unit looking up the authorized service processing function configuration in the license for the service processing function configuration to be loaded. If the configuration is to found, go to step D; if not, go to step E.

D. Loading the service processing function configuration (such as the operating system and application software) to each core according to the configuration parameters.

E. Prompting the user of insufficient authority and failure information.

Way 2: Use hardware configuration, comprising:

a. Pre-setting hardware configuration parameters on the hardware of the multi-core processor apparatus to indicate the service processing function corresponding to each core in the multi-core processor.

b. When the multi-core processor starts, the configuration management unit of the multi-core processor apparatus reading the hardware configuration parameters from the hardware, and then identifying the service processing function to be loaded and configured for each core of the multi-core processor according to the hardware configuration parameters.

c. Before loading service processing function configuration (such as the operating system and application software) for each core, the configuration management unit looking up the authorized service processing function configuration in the license for the service processing function configuration to be loaded. If the configuration is found, go to step d; if not, go to step e.

d. Loading the service processing function configuration (such as the operating system and application software) to each core according to the hardware configuration parameters.

e. Prompting the user of insufficient authority and failure information.

In way 2, the hardware configuration parameters can be set by setting status words with Dual In-line Package (DIP) switches. Suppose the pre-set status word is 6 for the router function and 7 for the firewall function. If you want to set the router function for core 0 of the multi-core processor and the firewall function for core 1 of the is multi-core processor, you can set the status word indicated by the DIP switch to 6 for core 0 and to 7 for core 1.

Alternatively, the hardware configuration parameters can be set by setting register configuration words for the apparatus in logical devices. In this case, different configuration words are used to indicate the service processing function to be performed by each core in the multi-core processor. Moreover, the hardware configuration parameters can be set by setting hardware resource configuration parameters of hardware interface cards. In this case, different hardware resource configuration parameters are used to indicate the function to be performed by each core in the multi-core processor.

The configuration made at step 303 is the original configuration made before the multi-core processor apparatus starts.

At step 304, while the multi-core processor is running, the configuration terminal connected to the multi-core processor receives user-input control commands, which contain the address of the destination core in the multi-core processor and configuration parameters, and sends the control commands to the multi-core processor apparatus.

At step 305, the multi-core processor apparatus sends the received control commands to the destination core.

At step 306, the destination core updates its configuration according to the received control commands.

Steps 304, 305, and 306 are performed by the present invention to update as needed the configuration of a core, the service processing function or the route forwarding table for example while the multi-core processor apparatus is running.

The following part details steps 304, 305, and 306 in conjunction with the internal architecture of the multi-core processor apparatus.

Figure 4:
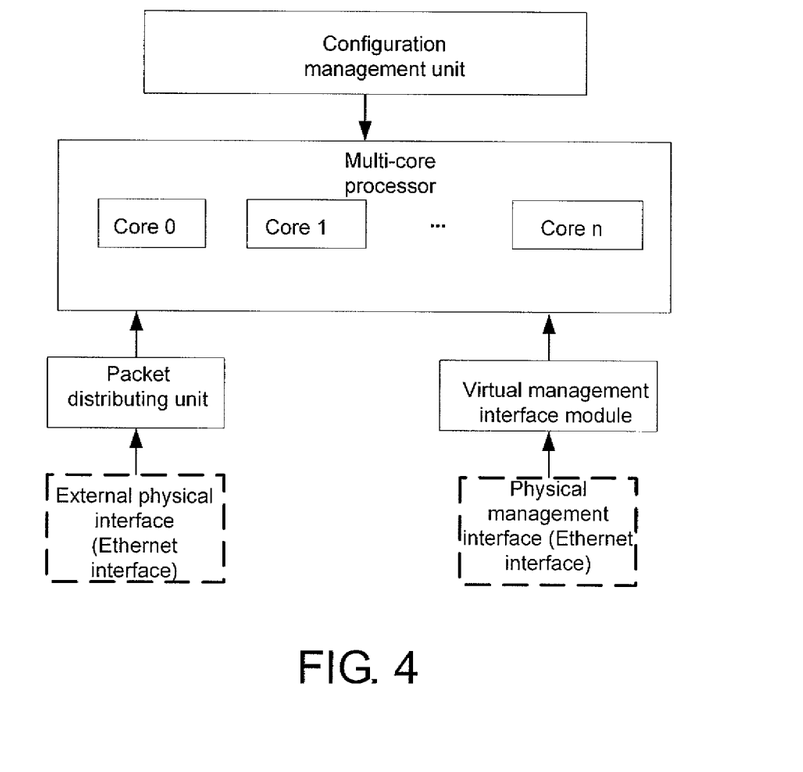
FIG. 4 is the first preferable block diagram of a multi-core to processor apparatus according to an embodiment of the present invention.

FIG. 4 is the first preferable block diagram for the multi-core processor apparatus according to an embodiment of the present invention. As shown in FIG. 4, to implement steps 304 through 306, the multi-core processor apparatus can contain the virtual management interface module and the physical management interface, which is connected to an external management terminal.

Thus, as shown in FIG. 4, when the user needs to update the configuration of a core, to change the service processing function of core 0 from the firewall function to the IPS processing function for example, the user can input the control command including the address of core 0 and the change instruction on the management terminal connected to the multi-core processor apparatus. The external management terminal then sends the received control command to the physical management interface of the multi-core processor apparatus, from which the control command is sent to the virtual management interface module. The virtual management interface module examines the core address carried in the control command and sends the control command to core 0. Receiving the control command, core 0 performs operations as instructed to load the operating system and application software for implementing the IPS function.

In actual service implementation, the user can input control commands in serial format locally on the management terminal connected to the multi-core processor. Thus, the physical management interface in FIG. 4 is a serial interface capable of receiving and sending control commands with a serial-format. Accordingly, the virtual management interface module shown in FIG. 4 also receives and sends control commands with a serial-format. In this case, the virtual management interface module can be implemented by one or multiple cores of the multi-core processor, or the current packet parsing and forwarding engine.

Alternatively, the user can input control commands in Ethernet format to the management terminal connected to the multi-core processor remotely through remote login (through the Web interface for example). Thus, the physical management interface in FIG. 4 is an Ethernet interface capable of receiving and sending control commands with an Ethernet-format. Accordingly, the virtual management interface module shown in FIG. 4 receives and sends control commands with an Ethernet-format. In this case, the virtual management interface module can be implemented by the current packet parsing and forwarding engine.

At step 307, the multi-core processor apparatus receives external packets while it is running.

At step 308, the multi-core processor delivers the packets to its cores in the pre-defined service processing sequence.

The following part describes two ways of implementing steps 307 and 308 in conjunction with two internal architectures of the multi-core processor apparatus.

Implementation 1

Figure 5:
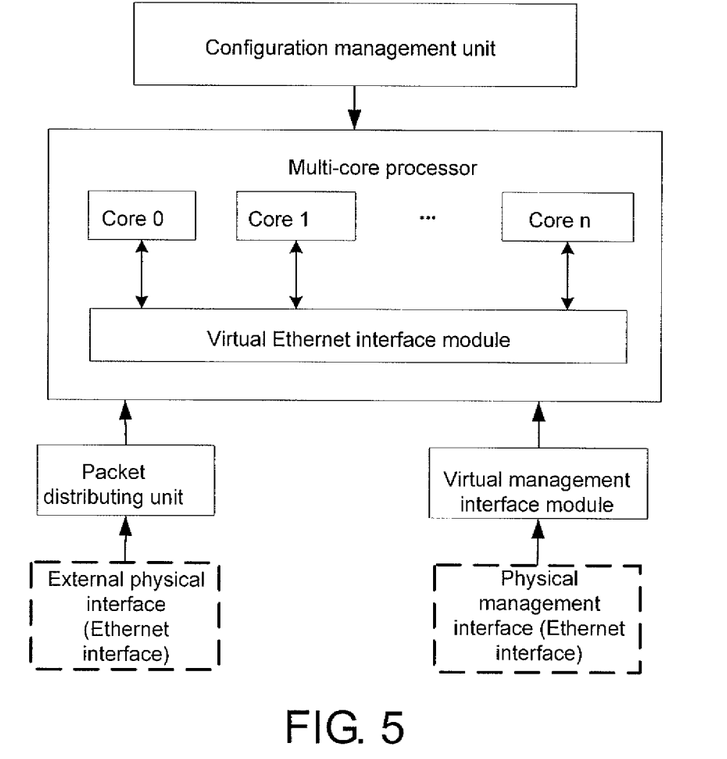
FIG. 5 is the second preferable block diagram of a multi-core processor apparatus according to an embodiment of the present invention.

FIG. 5 is the second preferable block diagram for the multi-core to processor apparatus according to an embodiment of the present invention. As shown in FIG. 5, the multi-core processor apparatus, based on the architecture shown in FIG. 4, further comprises a virtual data channel unit connecting all cores that perform service processing functions. According to the architecture shown in FIG. 5, steps 307 and 308 are implemented as follows:

The packet distributing unit receives external packets from the external physical interface and sends these packets to core 0, the core executing the first service processing function.

Core 0 maintains a forwarding table, which contains the IP address or MAC address of the core (core 1, for example) configured to perform the next service processing function. After core 0 receives the packets and performs the required service processing (firewall processing, for example), core 0 encapsulates the address of core 1 in the packets according to the forwarding table, and sends the processed packets to the virtual data channel unit through the virtual logical interface pre-assigned to itself.

After the virtual data channel unit receives the packets from core 0, it forwards the packets to core 1 according to the core address encapsulated in the packets.

If core 1 is not the core that executes the last service processing function, it performs service processing as core 0 does. It performs the required service processing (IPS processing, for example) for the received packets with the loaded service processing function and then encapsulates the packets with the address of the core that executes the next service processing function according to the forwarding table, and sends the packets to the virtual data channel unit through the virtual logical interface pre-assigned to itself. After the virtual data channel unit receives the packets from core 1, it forwards the packets to the next core (core n, for example) according to the address of the next core encapsulated in the packets.

If core n is the last core for processing the packets, it processes the received packets with the loaded service processing function, and sends the packets out the multi-core processor apparatus through the physical interface pre-assigned to itself.

Using the architecture shown in FIG. 5, the present invention can implement load balancing for a specific service processing function. To achieve this, at step 303, when the configuration management unit configures cores for service processing functions, it needs to further configure multiple cores for the service processing function requiring load balancing and configure the same address for these cores; additionally, during service processing, each of the cores outputs idle signals if it is idle and outputs busy signals if it is executing the service processing function.

Thus, during the procedure of executing steps 307 and 308 according to the architecture shown in FIG. 5: if the packet distributing unit identifies that the first service processing function requires load balancing, that is, if multiple cores including core 0 can execute the service processing function, the packet distributing unit can check the status signals output by each core that executes the service processing function, and sends the packets to core 0 if core 0 outputs idle signals; moreover, when the core address encapsulated in the packets corresponds to multiple cores, the virtual data channel unit checks the output status signals of all cores with the address, and sends the packets to cores outputting idle signals.

Figure 6:
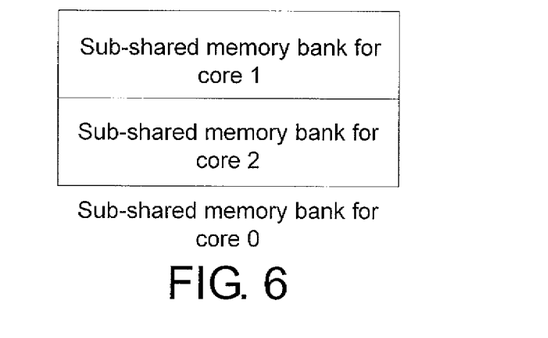
FIG. 6 is a schematic diagram illustrating a shared memory allocated to core 0 according to an embodiment of the present invention.

As is apparent, in implementation 1, all cores of the multi-core processor apparatus are connected to the same virtual data channel unit, which is responsible for transmitting packets according to the addresses encapsulated in the packets. In an embodiment of the present invention, using the virtual data channel unit for delivering packets between cores can comprise: first, when setting the virtual data channel unit, allocating a shared memory bank to each core, and dividing the shared memory bank of each core into sub-shared memory banks, each for one of the other cores. For example, as shown in FIG. 6, a shared memory bank is allocated to core 0. If cores 0, 1, and 2 of the multi-core processor execute the same service processing function, divide the shared memory bank of core 0 into two sub-shared memory banks with one for core 1 and the other for core 2; divide the shared memory bank of the other cores likewise. When core 0 needs to send packets to core 1 after processing them, core 0 encapsulates the address of core 1 in the packets and then sends them to the virtual data channel unit, and further sends receive notifications to core 1 through inter-core messages. When the virtual data channel unit receives the packets from core 0, it writes the packets into the sub-shared memory bank for core 1 in the shared memory bank of core 0 according to the core address encapsulated in the packets. After core 1 receives the receive notifications, it reads the packets from the sub-shared memory bank assigned to it in the shared memory bank of core 0. Thus, the virtual data channel unit helps deliver packets between any two cores.

Implementation 2

Figure 7:
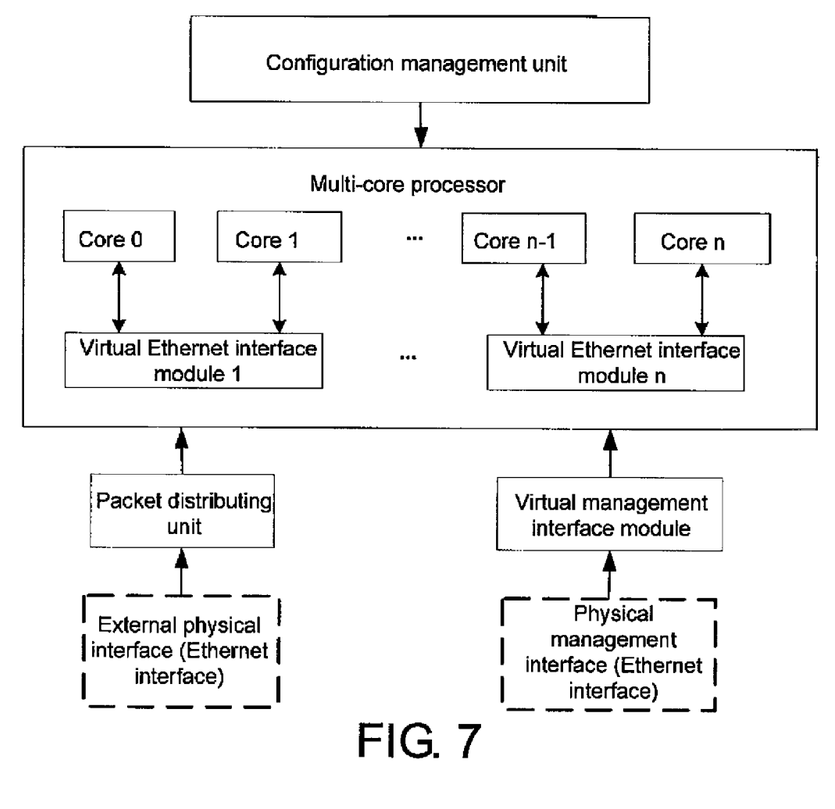
FIG. 7 is the third preferable block diagram of a multi-core processor apparatus according to an embodiment of the present invention.

FIG. 7 is the third preferable block diagram for the multi-core to processor apparatus according to an embodiment of the present invention. As shown in FIG. 7, the multi-core processor apparatus, based on the architecture shown in FIG. 4, further comprises multiple virtual data channel units, each connecting any two cores that require communication. For example, if packets need IPS processing by core is 1 after undergoing firewall processing by core 0, you can set virtual data channel unit 1 between core 0 and core 1; if packets need service processing by core n after undergoing service processing by core n−1, you can set virtual data channel unit n between core n−1 and core n.

Thus, according to the architecture shown in FIG. 7, steps 307 and 308 are implemented as follows:

The packet distributing unit receives external packets through the external physical interface and sends these packets to core 0, where the first service processing function is to be executed.

Core 0 processes the packets with the first service processing function (the firewall processing function, for example) and then sends the processed packets to core 1 through virtual data channel unit 1.

If core 1 is not the core that executes the last service processing function, it performs service processing as core 0 does. It performs the required service processing (antivirus processing, for example) for the received packets and sends the packets to the next core through the virtual data channel unit between itself and the next core, and so on until the packets reach the last core (core n).

After core n processes the received packets with the loaded service processing function, it sends the packets out the multi-core processor apparatus through the physical interface pre-assigned to itself.

Preferably, when the configuration management unit of the multi-core processor apparatus configures cores for service processing functions, it can specify one control core and one or multiple data processing cores for each service processing function. When multiple data processing cores are specified for a service processing function, they can perform active/standby switchover or load balancing.

Using the architecture shown in FIG. 7, the present invention can implement load balancing for a specific service processing function. To achieve this, at step 303, when the configuration management unit configures cores for service processing functions, it needs to further configure multiple cores of the multi-core processor for the service processing function requiring load balancing; additionally, during service processing, each of the cores outputs idle signals if it is idle and outputs busy signals if it is executing the service processing function.

Thus, during the procedure of executing steps 307 and 308 according to the architecture shown in FIG. 7:

if the packet distributing unit identifies that the first service processing function requires load balancing, that is, if multiple cores including core 0 can execute the first service processing function, the packet distributing unit can check the status signals output by each core corresponding to the service processing function, and sends the packets to core 0 if core 0 outputs idle signals.

Subsequently, when a core of the multi-core processor, upon finishing its service processing, detects that multiple cores are assigned to the next service processing function, that is, the service processing function requiring load balancing, the core checks the output status signals of all the cores corresponding to the next service processing function, and sends the packets to cores outputting idle signals through the virtual data channel units between itself and the cores outputting idle signals.

As is apparent, in implementation 2, there is a virtual data channel unit between each two cores in the multi-core processor apparatus. Using a virtual data channel unit for delivering packets between two cores can comprise: first, when setting a virtual data channel unit between any two cores, allocating a shared memory bank to the two cores and dividing the shared memory bank into two sub-shared memory banks, and the two sub-shared memory banks being assigned for the two cores respectively; when either core sends packets to the virtual data channel unit, the core further sending a receive notification to the receiving core; when the virtual data channel unit receives the packets from the sending core, it writing the packets into the sub-shared memory bank corresponding to the sending core in the shared memory bank, and the receiving core reading the packets from the sub-shared memory bank according to the receive notification.

As implementation 2 is easier to implement in practice, the following part uses embodiment S to illustrate the packet delivery procedure between two cores with a virtual data channel unit in between.

Embodiment S

Figure 8:
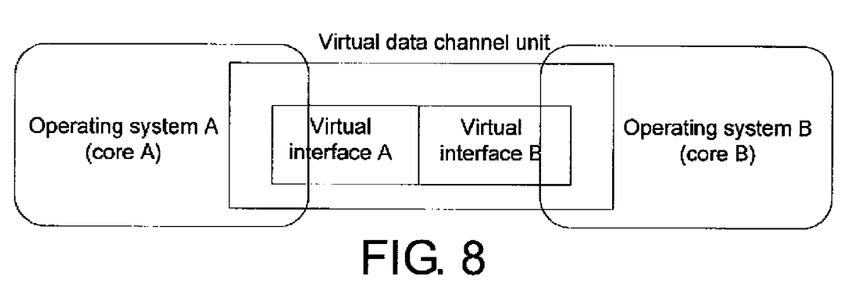
FIG. 8 is a schematic diagram illustrating a virtual data channel unit composed of two virtual Ethernet interfaces according to an embodiment of the present invention.

The virtual data channel unit set between two cores can be formed by two interconnected virtual interfaces, and the two connected virtual interfaces respectively correspond to the two cores connected with the virtual data channel unit, more particularly for the operating system of each core. The virtual data channel unit simulates the physical interfaces through software in place of the related hardware and drive software. As the simulating interfaces still appear as physical interfaces to the upper-layer software, the upper-layer software can be ported to the multi-core processor without any modification. The virtual interfaces can simulate multiple types of physical interfaces such as Ethernet and serial interfaces. The packet delivery procedure between two cores does not vary by interface type. In this embodiment, virtual Ethernet interfaces are used for example. The operating system of each core corresponds to a virtual Ethernet interface, and two virtual Ethernet interfaces constitute a virtual data channel unit, as shown in FIG. 8.

In practical applications, each virtual Ethernet interface comprises a management module and a data transceiving module, wherein:

the management module is used for initializing the local virtual Ethernet interface, and when the operating system of the core corresponding to the local virtual Ethernet interface starts or shuts down, notifying the peer (that is, the operating system of the core corresponding to the other virtual Ethernet interface) of the startup or shutdown;

the data transceiving module is used for transmitting and receiving data through the shared memory bank and inter-core messages.

The management module can comprise: an initialization sub-module used for initializing the local virtual Ethernet interface similar to initializing the hardware chip of a real Ethernet port; a registration sub-module used for registration with the operating system of the core corresponding to the local virtual Ethernet interface, that is, registering the local virtual Ethernet interface as an Ethernet port in a similar procedure of registering a real Ethernet interface to spoof the operating system or upper-layer software to take the virtual Ethernet interface as an Ethernet port, thus making possible direct porting of the upper-layer software to the multi-core processor; a management sub-module used for managing the state of the local virtual Ethernet interface and notifying the operating system of the other virtual Ethernet interface of the startup/shutdown of the core (or rather, the operating system of the core) corresponding to the local virtual interface.

The data transceiving module is the core of the virtual Ethernet interface. It is responsible for transmitting and receiving data. The data transceiving module is implemented completely by software and does not involve real hardware chips for transmitting and receiving data. The data transceiving module comprises:

a data transmitting sub-module, which writes packets of the corresponding core into the shared memory (more particularly, the sub-shared memory bank for the sending core in the shared memory bank allocated to the virtual data channel unit), and then sends the start address of the shared memory (more particularly, the sub-shared memory bank for the sending core in the shared memory) and the packet length to the receiving core (that is, the operating system of the core corresponding to the other virtual Ethernet interface) through inter-core messages to ask the peer operating system to read the packets from the sub-shared memory bank for the sending core in the shared memory;

a data receiving sub-module, which receives inter-core messages to from the other cores and reads packets from the sub-shared memory bank for the sending core in the said shared memory according to the start address of the secondary memory bank and the packet length carried in the received inter-core messages.

Wherein, the operating system of the sending core has read/write and release access to the sub-shared memory bank assigned to it in the shared memory, whereas the operating system of the receiving core has only read access.

The following part describes how packet delivery is completed between two cores through a virtual data channel unit by using a specific procedure, which comprises these steps:

At step s101, set a virtual data unit channel between two cores, wherein the virtual data channel unit comprises two virtual Ethernet interfaces, one for the operating system of each interconnected core. When the operating system of each core starts, the corresponding virtual Ethernet interface initializes, and registers with the operating system; additionally, when the operating system of each core starts up or shuts down, the corresponding virtual Ethernet interface, to make the peer know whether it is available, notifies the operating system of the other core of the startup or shutdown.

At step s102, the two cores exchange packets through the virtual data channel unit in between.

Wherein, the operating system of the sending core obtains the sub-shared memory bank assigned to it in the shared memory bank (the sending core has read/write access to the sub-shared memory bank assigned to it while the receiving core has only the read access; likewise, the operating system of the receiving core has read/write access to the sub-shared memory bank assigned to it but the sending core has only read-only access); the operating system of the sending core writes packets into its sub-shared memory bank, and sends the start address of the sub-shared memory bank and the data length through inter-core messages to the operating system of the receiving core; the operating system of the receiving core reads the packets from the sub-shared memory bank of the sending core through its connected virtual Ethernet interface, and after processing the packets, sends the start address of the sub-shared memory bank in inter-core messages to the operating system of the sending core; then the operating system of the sending core reclaims the said sub-shared memory bank assigned to the sending core.

The following part describes the implementation and processing procedure of a virtual data channel unit in multi-core processor applications, taking a dual-core processor for example. The description will be focused on data sending and receiving, initialization, and processing of virtual Ethernet interface states. This method is also applicable to a processor with more than two cores.

Figure 9:
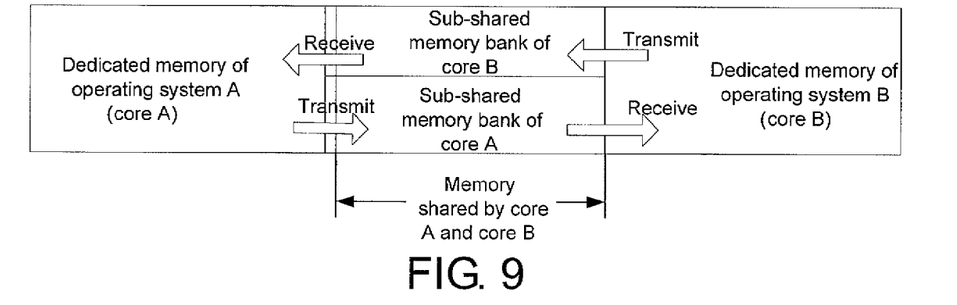
FIG. 9 is a schematic diagram illustrating memory allocation according to an embodiment of the present invention.

All cores of a multi-core processor physically share all memory. However, when the operating system of each core initializes, the memory is broken down into parts, two parts in this example, each mapped to the address space of the operating system of a core. Thus, a physical memory bank is logically divided into two parts corresponding to the operating systems of the two cores, as shown in FIG. 9. The two logical parts are further broken down into three parts: dedicated memory for the operating system of core A (namely, operating system A), dedicated memory for the operating system of core B (namely, operating system B), and the shared memory for core A and core B. Wherein, to solve the write/read conflict in the shared memory, the shared memory of core A and core B is divided into two parts: the sub-shared memory for core A and that for core B. Operating system A maintains the sub-shared memory bank assigned to core A, that is, pre-allocates m n-byte memory blocks (m and n depend on the physical memory capacity and Ethernet transmission requirements), and manages the pre-allocated memory blocks by maintaining a linked list. Operating system A has read/write access to the sub-shared memory bank of core A, whereas operating system B has only read-only access. Operating system B manages the sub-shared memory bank assigned to core B in the same way. Likewise, operating system B has read/write access to the sub-shared memory bank of core B, whereas operating system A has only read-only access.

When core A sends packets to core B, that is, when virtual Ethernet interface A sends packets to virtual Ethernet interface B, the process is as follows (the same process applies to the packet delivery in the reverse direction):

At step 1, operating system A obtains memory block M from the sub-shared memory bank of core A and updates the linked list. Accordingly, core A is assigned read/write access to the memory block M, whereas operating system B has no access.

At step 2, operating system A writes packets into memory block M, and sends the start address of memory block M and the packet length in an inter-core message to operating system B.

At step 3, operating system B receives the packets, during which operating system B has read access to memory block M whereas operating system A is denied access.

At step 4, after completing receiving the packets, operating system B sends the start address of the memory block in an inter-core message to the operating system A.

At step 5, operating system A updates the linked list and reclaims memory block M.

Figure 10:
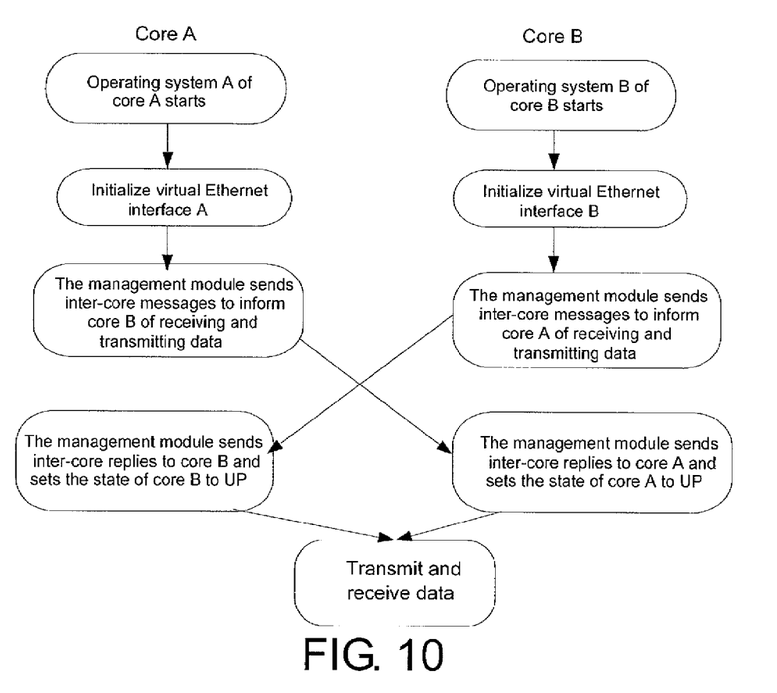
FIG. 10 is the overall processing flow chart of a virtual data channel according to an embodiment of the present invention.

The virtual Ethernet interfaces A and B notify each other of its state (UP or DOWN) through inter-core messages, and can send or receive packets only when both are UP. When the operating system of a core starts, it notifies the peer of its UP state by sending an inter-core message, thus informing the peer that its virtual interface can receive packets. Before the operating system of a core goes DOWN, it notifies the peer of its DOWN state, thus informing the peer that its virtual interface cannot receive packets. After the CPU is powered up, the whole processing flow of the virtual data channel unit is as shown in FIG. 10, comprising: operating system A starting up; virtual Ethernet interface A, which corresponds to operating system A, initializing; the management module of virtual Ethernet interface A sending inter-core messages to inform core B that core A can send and receive packets; the management module of virtual Ethernet interface A, after receiving notifications from the management module of virtual Ethernet interface B, which corresponds to core B, sending inter-core reply messages to core B and setting the maintained state of B to UP; core A and core B sending and receiving packets between them. The processing procedure also applies to core B. For details, refer to FIG. 10.

Thus, embodiment S is completed.

It should be noted that, in the multi-core processor apparatus provided by the present invention as shown in FIG. 2 through FIG. 7, the configuration management unit can be implemented by one or more cores in the multi-core processor. For example, you can reserve a core in the multi-core processor as the configuration management unit dedicated to management and control such as device startup/termination and resource allocation. For another example, you can multiplex the management configuration unit and a service processing function onto a core in the multi-core processor to use the core not only for the configured service processing function but also as the configuration management unit.

Moreover, as shown in FIG. 2 through FIG. 7, in the multi-core processor apparatus provided by the present invention, the packet distributing unit can be implemented by one or more cores in the multi-core processor. Similar to implementing the configuration management unit, you can reserve a dedicated core in the multi-core processor as the packet distributing unit, or multiplex the packet distributing unit and a service processing function onto a core. For example, suppose core 0 has been configured with the firewall processing function. You can further configure core 0 as the packet distributing unit.

Additionally, when both the physical management interface internal to the multi-core processor apparatus and the external physical interface are Ethernet interfaces, the physical management interface and the external physical interface can be multiplexed.

In the present invention, the multi-core processor apparatus refers to any network device containing a multi-core processor.

In the present invention, the simulated interfaces created by the virtual data channel unit can be virtual Ethernet interfaces or virtual serial interfaces.

Although an embodiment of the invention and its advantages are described in detail, a person skilled in the art could make various alternations, additions, and omissions without departing from the spirit and scope of the present invention as defined by the appended claims.

What is claimed is:

1. A method for implementing multiple service processing functions, which is implemented by an apparatus comprising a multi-core processor, comprising:
   configuring each core of the multi-core processor to execute a specific service processing function, and when the multi-core processor starts, loading service processing function configuration corresponding to the service processing function for the core, wherein the service processing function configuration comprises an operation system and application software; and
   after receiving a packet, according to a pre-defined service processing sequence, sending the packet to the cores of the multi-core processor that execute service processing functions in turn.

2. The method of claim 1, before each core of the multi-core processor is configured to process the specific service, further comprising: identifying whether a service processing function to be configured is authorized in an obtained license, and if yes, continuing to configure the core to process the specific service.

3. The method of claim 2, wherein configuring each core of the multi-core processor to process a specific service, and when the multi-core processor starts, loading service processing function configuration corresponding to the service processing function for the core comprises:
   pre-setting configuration parameters in a configuration file to indicate the service processing function corresponding to each core of the multi-core processor; loading the service processing function configuration for each core according to the configuration parameters in the configuration file when the multi-core processor starts;
   or,
   pre-setting hardware configuration parameters in hardware to indicate the service processing function corresponding to each core of the multi-core processor; loading the service processing function configuration for each core according to a hardware configuration parameter when the multi-core processor starts.

4. The method of claim 3, wherein the hardware configuration parameter can be a status word indicated by a Dual In-line Package (DIP) switch, a register configuration word of an apparatus in a logic device or a hardware resource configuration parameter of a hardware interface card.

5. The method of claim 1, wherein configuring each core of the multi-core processor to process a specific service, and when the multi-core processor starts, loading service processing function configuration corresponding to the service processing function for the core comprises:

predefining a service processing function corresponding to each core of the multi-core processor in a license; loading the service processing function configuration for each core according to the license when the multi-core processor starts.

6. The method of claim 1, after each core of the multi-core processor is configured to process the specific service, further comprising: receiving a control command from a user, and sending the command to a destination core according to a core address in the command. The destination core updates configuration as per a configuration parameter in the command.

7. The method of claim 1, further comprising: setting a virtual data channel unit in advance, and connecting the cores with the virtual data channel unit;

wherein sending the packet to the cores of the multi-core processor that execute service processing functions in turn comprises: sending the packet to a core that executes the first service processing function; after completing the service processing, encapsulating by the core an address of a receiving core in the packet and delivering the packet to the virtual data channel unit; delivering by the virtual data channel unit the packet to the receiving core according to the address of the receiving core encapsulated in the packet; continuing the process until the packet reaches a core that execute the last service processing function.

8. The method of claim 7, wherein setting a virtual data channel unit comprises: assigning a shared memory bank to each core, and dividing the shared memory bank of each core into sub-shared memory banks, the sub-shared memory banks being assigned for other cores respectively;

after sending by a core the packet to the virtual data channel unit, further comprising: sending by the core sending the packet a notification to the receiving core through an inter-core message;

wherein, delivering by the virtual data channel unit the packet to the receiving core according to the address of the receiving core encapsulated in the packet comprises: writing by the virtual data channel unit the packet into a sub-shared memory bank assigned for the receiving core in a shared memory bank of the core sending the packet; reading by the receiving core the packet from its sub-shared memory bank in the shared memory bank of the core sending the packet after receiving the notification.

9. The method of claim 1, further comprising: setting a virtual data channel unit between each two cores;

wherein sending the packet to the cores of the multi-core processor that execute service processing functions in turn comprises: sending the packet to a core that executes the first service processing function; after completing the service processing, delivering by the core the packet directly to a next core through the virtual data channel unit between the core and the next core; continuing the process until the packet reaches a core that executes the last service processing function.

10. The method of claim 9, wherein setting a virtual data channel unit between each two cores comprises: assigning a shared memory bank to each two cores, and dividing the shared memory bank into two sub-shared memory banks, the two sub-shared memory banks being assigned for the two cores respectively;

after sending by a core the packet to the virtual data channel unit, further comprising: sending by the core sending the packet a notification to a receiving core through an inter-core message;

wherein delivering by the core the packet directly to a next core through the virtual data channel unit comprises: after the virtual data channel unit receives the packet from a connected core, writing by the core the packet into a sub-shared memory bank assigned for the core sending the packet in the shared memory bank; reading by the receiving core the packet from the sub-shared memory bank assigned for the core sending the packet after receiving the notification.

11. The method of claim 7 further comprising: specifying a service processing function that requires load balancing;

configuring multiple cores of the multi-core processor for the service processing function that requires load balancing;

wherein sending the packet to a core configured for the service processing function that requires load balancing comprises: checking output status signals of all cores corresponding to the service processing function that requires load balancing, and sending the packet to cores outputting idle signals.

12. An apparatus comprising a multi-core processor, comprising:

a configuration management unit, used for configuring each core of the multi-core processor to execute a service processing function, and when the multi-core processor starts, load service processing function configuration corresponding to the service processing function for the core, wherein the service processing function configuration comprises an operation system and application software;

a packet distributing unit, used for distributing a packet from an external physical interface to a core that performs the first service processing function; and cores of the multi-core processor, used for executing service processing functions for the received packet in a pre-defined service processing sequence and delivering the processed packet.

13. The apparatus of claim 12, wherein the configuration management unit is used for, upon startup of the multi-core processor, reading from a BOOT menu a configuration file, the configuration file containing parameters indicating the service processing function assigned to each core of the multi-core processor, and for loading service processing function configuration for each core according to the configuration parameters.

14. The apparatus of claim 12, wherein the configuration management unit is used for, upon startup of the multi-core processor, reading from a hardware card hardware configuration parameters that indicate the service processing functions assigned to the cores of the multi-core processor, and for loading service processing function configuration for each core according to the hardware configuration parameters.

15. The apparatus of claim 13, wherein the configuration management unit is used for, before configuring a core of the multi-core processor to process a specific service, identifying whether a service processing function to be configured is authorized in an obtained license, and, if yes, continuing to configure the core to process the specific service.

16. The apparatus of claim 12, further comprising a virtual management interface module and a management physical interface, wherein
  the management physical interface is used for receiving a control command containing an address of a destination core in the multi-core processor from an external management terminal, and for sending the control command to the virtual management interface module;
  the virtual management interface module is used for sending the control command to the destination core according to the address of the destination core contained in the control command;
  the destination core in the multi-core processor is used for updating configuration according to a configuration parameter in the control command.

17. The apparatus of claim 16, wherein the management physical interface is a serial interface for receiving the control command with a serial-format, and, the virtual management interface module is used for receiving and sending the control commands with the serial-format;
  or,
  the management physical interface is an Ethernet port for receiving the control command with an Ethernet-format, and the virtual management interface module is used for receiving and sending the control command with the Ethernet-format.

18. The apparatus of claim 17, wherein the virtual management interface module, when being used for receiving and sending the control command with the serial-format, is one or multiple cores of the multi-core processor or a packet parsing and distributing engine;
  the virtual management interface module, when being used for receiving and sending the control command with the Ethernet-format, is a packet parsing and distributing engine.

19. The apparatus of claim 17, wherein the management physical interface and the external physical interface are multiplexed when the management physical interface and the external physical interface are both Ethernet interfaces.

20. The apparatus of claim 12, further comprising a virtual data channel unit used for connecting the cores of the multi-core processor, wherein
  each core is used for, if the core is not one that performs the last service processing function, encapsulating in the packet an address of a receiving core and sending the packet to the virtual data channel unit; or is used for, if the core is one that performs the last service processing function, sending the processed packet out;
  the virtual data channel unit is used for sending the packet to the receiving core according to the address of the receiving core encapsulated in the packet.

21. The apparatus of claim 20, wherein the virtual data channel unit comprises a shared memory bank assigned to each core, and each shared memory bank is divided into sub-shared memory banks, the sub-shared memory banks being assigned for the other cores respectively; and,
  the virtual data channel unit is used for, according to the address of the receiving core encapsulated in packet, writing the packet into a sub-shared memory bank assigned for the receiving core in a shared memory bank of the core sending the packet, so that the receiving core reads the packet from the sub-shared memory bank after receiving the notification from the core sending the packet.

22. The apparatus of claim 21, wherein the configuration management unit is used for configuring multiple cores of the multi-core processor for a service processing function that requires load sharing, and assigning the multiple cores a same address;
  the packet distributing unit is used for, if the first service processing function to be executed requires load sharing, checking output status signals of all cores corresponding to the service processing function that requires load balancing, and sends the packet to cores outputting idle signals. the virtual data channel unit is used for, if the address of the receiving core encapsulated in the packet corresponds to multiple cores, first checking the output status signals of all cores with the address, and sends the packet to cores outputting idle signals.

23. The apparatus of claim 12, comprising a virtual data channel unit between each two cores, wherein,
  each core is used for, if the core is not one that executes the last service processing function, sending the processed packet to the virtual data channel unit connecting a next core; or is used for, if the core is one that executes the last service processing function, sends the processed packet out;
  each virtual data channel unit is used for delivering the packet between the cores connected to the virtual data channel unit.

24. The apparatus of claim 23, wherein each virtual data channel unit includes a shared memory bank assigned to the two cores connected with the virtual data channel unit, and the shared memory bank is divided into two sub-shared memory banks, the two sub-shared memory banks being assigned for the two cores respectively; and
  each virtual data channel unit is used for writing the packet to the sub-shared memory bank assigned for the core sending the packet in the shared memory bank, so that the receiving core reads the packet from the sub-shared memory bank after receiving the notification sent by the core sending the packet through an inter-core message.

25. The apparatus of claim 23, wherein each virtual data channel unit comprises two connected virtual interfaces, the two connected virtual interfaces respectively correspond to the two cores connected to the virtual data channel unit, and each virtual interface comprises:
  a management module, used for initializing a local virtual interface, and when a core corresponding to the local virtual interface starts or shuts down, notifying a core corresponding to the other virtual interface of a start/shutdown action.
  a data transceiving module, used for sending and receiving the packet by using the shared memory and an inter-core message.

26. The apparatus of claim 25, wherein the data transceiving module comprises:
  a data sending module, used for writing the packet sent by the core corresponding to the local virtual interface into the sub-shared memory bank assigned for the core sending the packet, and sending a start address of the sub-shared memory bank and length of the packet to the receiving core in the inter-core message so that the receiving core reads the packet
  a data receiving module, used for receiving the inter-core message from the other core, and reading the packet according to the start address of the sub-shared memory bank and the length of the packet in the inter-core message.

27. The apparatus of claim 23, wherein the configuration management unit is further used for configures multiple cores for a service processing function that requires load sharing;

the packet distributing unit is used for, when the first service processing function to be executed requires load sharing, checking output status signals of all cores corresponding to the service processing function that requires load balancing and sending the packet to cores outputting idle signals;

each core is used for, when a next service processing function requires load sharing, checking the output status signals of all cores corresponding to the service processing function that requires load balancing, and sends the packet to cores outputting idle signals through the virtual data channel unit between the cores outputting idle signals.

28. The apparatus of claim 12, wherein the configuration management unit or the packet distributing unit is one or multiple cores of the multi-core processor.

29. The apparatus of claim 25, wherein the virtual interface of the virtual data channel unit is a virtual Ethernet interface or a virtual serial interface;

and/or, the virtual data channel unit is implemented by one or multiple cores of the multi-core processor.

30. The method of claim 9, further comprising:

specifying a service processing function that requires load balancing;

configuring multiple cores of the multi-core processor for the service processing function that requires load balancing;

wherein sending the packet to a core configured for the service processing function that requires load balancing comprises: checking output status signals of all cores corresponding to the service processing function that requires load balancing, and sending the packet to cores outputting idle signals.

31. The apparatus of claim 14, wherein the configuration management unit is used for, before configuring a core of the multi-core processor to process a specific service, identifying whether a service processing function to be configured is authorized in an obtained license, and, if yes, continuing to configure the core to process the specific service.

32. The apparatus of claim 12, wherein the configuration management unit is used for predefining a service processing function corresponding to each core of the multi-core processor in a license; loading the service processing function configuration for each core according to the license when the multi-core processor starts.

* * * * *

UNITED STATES PATENT AND TRADEMARK OFFICE
CERTIFICATE OF CORRECTION

PATENT NO. : 8,417,848 B2
APPLICATION NO. : 12/743972
DATED : April 9, 2013
INVENTOR(S) : Wu Yang et al.

It is certified that error appears in the above-identified patent and that said Letters Patent is hereby corrected as shown below:

In the Claims:

In column 13, line 17, in Claim 6, delete "command. The" and insert -- command, the --, therefor.

In column 16, line 9, in Claim 22, delete "signals." and insert -- signals, --, therefor.

In column 16, line 47, in Claim 25, delete "action." and insert -- action, --, therefor.

Signed and Sealed this
Sixth Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,417,848 B2 | Page 1 of 1 |
| APPLICATION NO. | : 12/743972 | |
| DATED | : April 9, 2013 | |
| INVENTOR(S) | : Wu Yang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this
Twenty-eighth Day of January, 2014

Michelle K. Lee
*Deputy Director of the United States Patent and Trademark Office*